Jan. 5, 1954   V. EY   2,664,672
FLUID PRESSURE REGULATOR WITH AUTOMATIC
MEANS FOR SHUTTING OFF THE FLUID
Filed Oct. 20, 1950   3 Sheets-Sheet 3
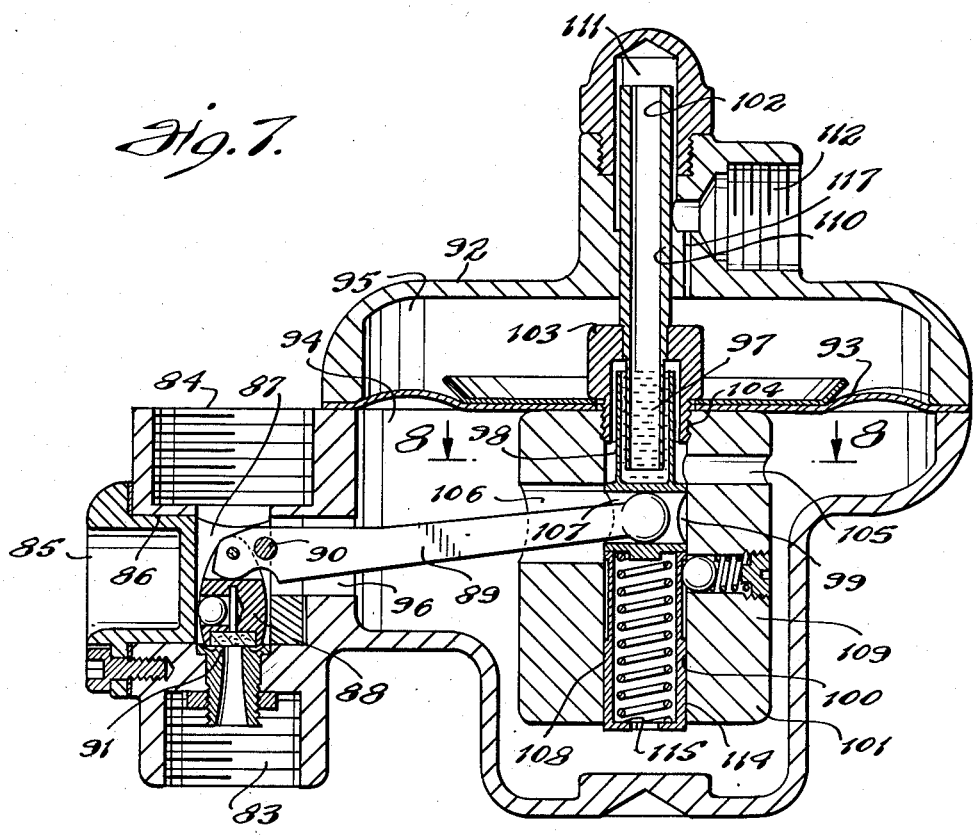
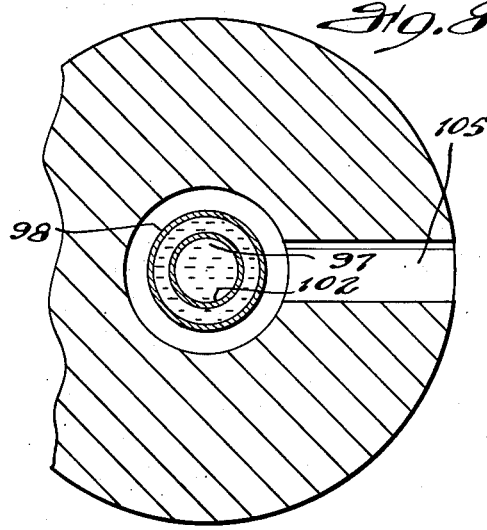
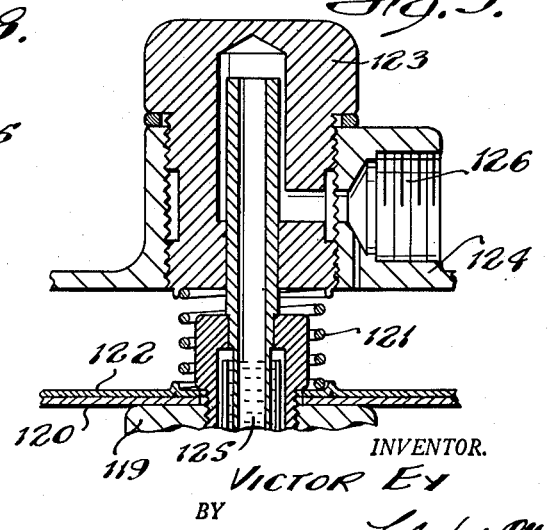
INVENTOR.
VICTOR EY
BY
Clark & Ott
ATTORNEYS Patented Jan. 5, 1954

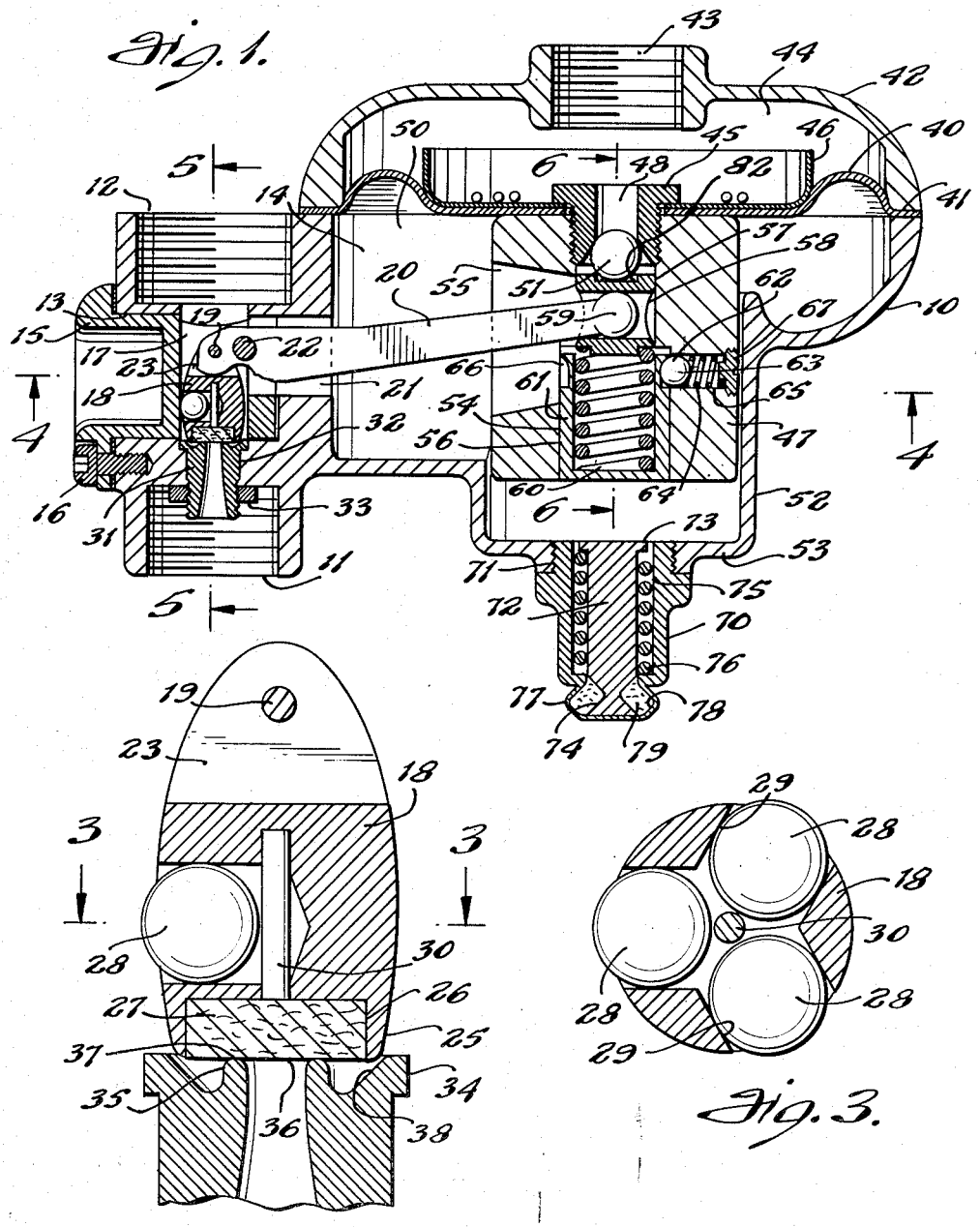

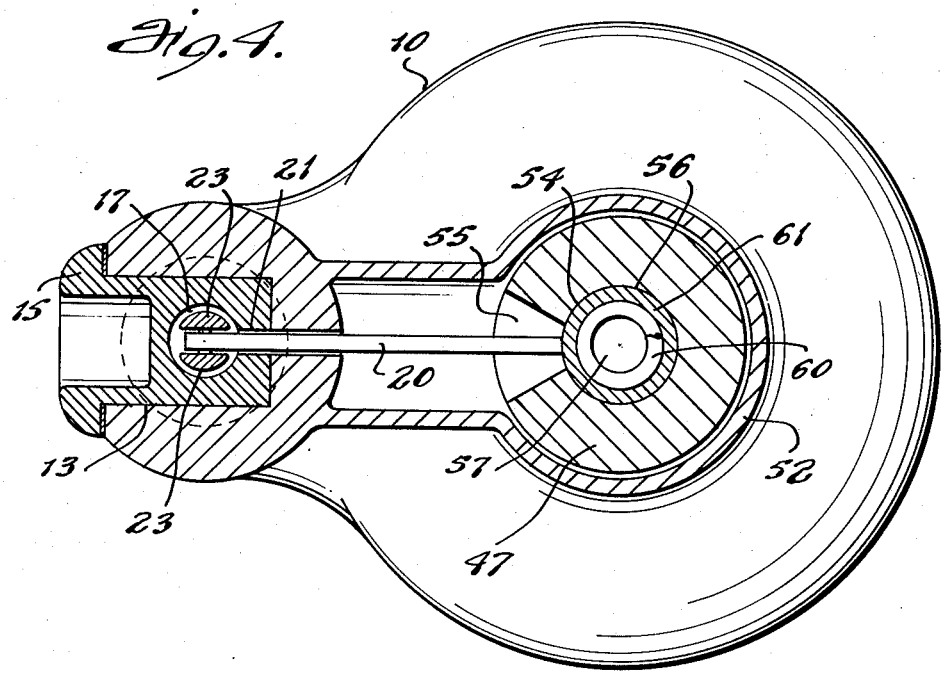
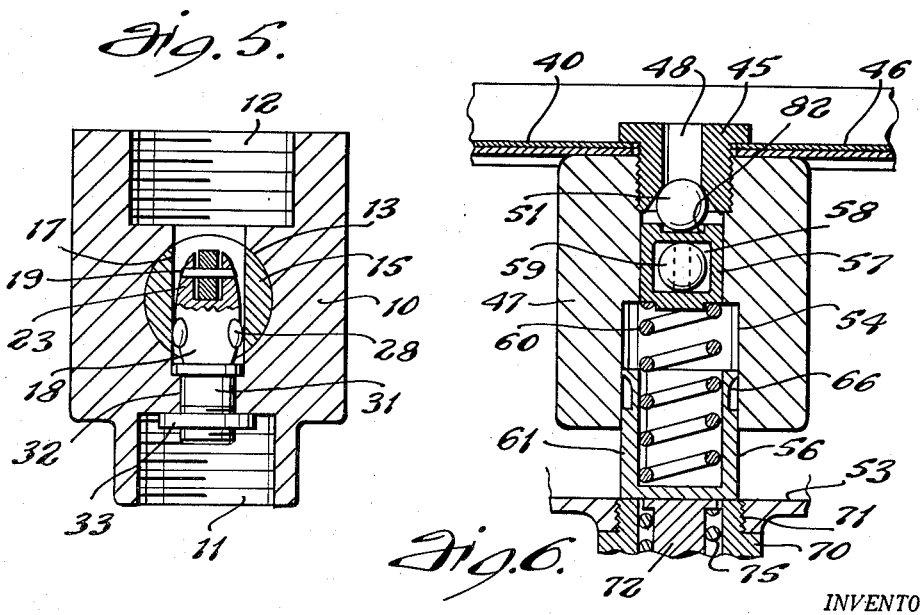

2,664,672

UNITED STATES PATENT OFFICE 2,664,672

FLUID PRESSURE REGULATOR WITH AUTOMATIC MEANS FOR SHUTTING OFF THE FLUID

Victor Ey, Woodside, N. Y.

Application October 20, 1950, Serial No. 191,179

4 Claims. (Cl. 50—5)

This invention relates to fluid pressure regulators and has particular reference to a regulator of said character having safety means for shutting off the flow of the fluid at a predetermined pressure and for venting the fluid to the atmosphere in the event that the pressure within the regulator exceeds said predetermined pressure.

Regulators of this type are installed in homes, buildings and the like for reducing the pressure of gas admitted from the high pressure line and for supplying the same under reduced pressure through the service line for heating, cooking, lighting and the like. Such regulators embody a valve closure element which is actuated for opening and closing the valve thereof in accordance with the supply of gas required by movement of a flexible diaphragm having a weight affixed thereto for effecting movement thereof in one direction and which has the pressure of the gas within the regulator exerted thereagainst for movement of the diaphragm in the opposite direction.

The invention also comprehends a fluid pressure regulator for supplying gas to consumers and which regulator is so constructed and arranged as to automatically shut off the flow of gas from the inlet to prevent the flow thereof through the outlet of the regulator and to the consumer in the event that the pressure within the regulator exceeds a predetermined limit.

Another object of the invention is the provision of a regulator of said character having an expansion device which is normally tensioned against valve means in the diaphragm for retaining the same in closed relation and which is automatically released by increase of the pressure of the gas in the regulator beyond a predetermined limit whereby the valve means is opened to permit of the venting of the gas to the atmosphere.

Still another object of the invention is the provision of a regulator of the character described in which the valve closure element for regulating the flow of the gaseous fluid through the regulator is pivoted to a lever having one end interposed between said expansion device and said diaphragm valve means for movement of the lever with the diaphragm for regulating the flow of fluid through the regulator and which lever forms an abutment for limiting the movement of the expansion device with the diaphragm to thereby release the same for venting the regulator in the event the pressure within the regulator increases so as to move the diaphragm beyond a predetermined limit.

Still another object of the invention is in the provision of a regulator embodying a modified form in which a mercury seal is provided for sealing off the flow of gaseous fluid from the regulator to the vent until the pressure in the regulator exceeds a predetermined limit which is set for venting the fluid to the atmosphere at a higher pressure than the pressure at which the expansion device is released to move the valve element to closed relation.

With the foregoing and other objects in view, reference is now made to the following specification and accompanying drawings in which the preferred embodiment of the invention is illustrated.

In the drawings:

Fig. 1 is a vertical sectional view through a fluid pressure regulator constructed in accordance with the invention and illustrating the same in closed relation.

Fig. 2 is an enlarged fragmentary sectional view through the valve closure element and valve port.

Fig. 3 is a horizontal sectional view taken approximately on line 3—3 of Fig. 2.

Fig. 4 is a horizontal sectional view taken approximately on line 4—4 of Fig. 1.

Fig. 5 is a vertical sectional view taken approximately on line 5—5 of Fig. 1.

Fig. 6 is a vertical sectional view taken approximately on line 6—6 of Fig. 1 and illustrating the expansion device in released relation and the valve through the diaphragm in open relation to vent the regulator.

Fig. 7 is a vertical sectional view through a fluid pressure regulator illustrating a modified form of the invention.

Fig. 8 is a fragmentary sectional view taken approximately on line 8—8 of Fig. 7.

Fig. 9 is a fragmentary sectional view showing the upper portion of the regulator with a spring for augmenting the pressure of the weight on the diaphragm.

Referring to the drawings by characters of reference, the regulator illustrated is shown in its application for use in supplying gas to homes, buildings and the like. The regulator is adapted to be connected with the high pressure supply line leading into the building from the main in the street containing gas which may have a pressure of 10 to 75 lbs. per square inch and which is reduced by the regulator for use at approximately ⅓ lb. pressure.

The regulator includes a casing 10 having threaded inlet and outlet openings 11 and 12 arranged in axial alignment at one side thereof and adapted to be respectively connected with a high pressure supply line and a low pressure service line. Intermediate the inlet and outlet openings 11 and 12 the casing is formed with a cylindrical cavity 13 which opens through one side of the casing and communicates at its inner end with the hollow interior 14 of the casing. Snugly fitted into said cavity is a cylindrical member 15 having a headed outer end secured against the side of the casing by screws 16. The cylindrical member 15 is formed with a bore 17 arranged in axial alignment with the inlet and outlet openings 11 and 12 and forming a passageway therebetween in which is arranged a valve closure element 18 pivotally mounted on a pivot pin 19 on the end of a lever 20 projecting into said passageway through a slot 21. The slot 21 extends vertically through the inner end of said cylindrical member and opens into said passageway longitudinally thereof with the inner end of said lever protruding therethrough and projecting into the hollow interior 14 of the casing. The lever 20 is rockable in said slot on a cross pin 22 for imparting reciprocatory movement to the valve closure element 18 toward and away from a valve seat in response to change of pressure in the hollow interior 14 as will be more fully explained hereinafter.

The valve closure element 18 is bifurcated at its upper end through which furcations 23 the pivot pin 19 extends for pivotally connecting said element to the outer end 24 of the lever 20. The lower end of the closure element is of general oval formation in vertical section and of circular formation in horizontal section so as to provide an arcuate or spherical peripheral wall portion 25 at the lower end thereof. The said element is formed with an annular recess 26 in the lower end wall thereof in which is fitted a fibrous disk 27 fashioned from leather or other equivalent material. The said closure element is mounted for guided reciprocatory movement in the passageway 17 on balls 28 disposed for free turning movement in cylindrical sockets 29 arranged in said closure element about the axis thereof. The balls are three in number and are disposed with adjacent balls spaced apart an angle of 120° in a plane extending horizontally through the closure element with the balls engaging against a center pin 30 arranged vertically at the intersection of the cylindrical sockets. The balls protrude through the outer ends of said sockets for snug rolling engagement against the peripheral wall of the passageway thereby centering the lower end of the closure element with reference to the valve seat when in closed relation so as to prevent escape of gas and permit slight variation of pressure in the casing to effect movement thereof and to avoid sticking or freezing of the valve element.

The valve seat is formed on the inner end of a bushing 31 fitted in the reduced inner end 32 of the inlet opening 11 and has its protruding lower end threadedly engaged by a nut 33 for securing the bushing in position. The bushing is formed with an enlarged or flanged inner end 34 which is fitted in a recess in the inner end of the reduced portion of the inlet opening 11. The flanged inner end 34 is provided with an annular recess defining an upstanding peripheral wall 35 surrounding the central opening or valve port 36 in the bushing 31 which peripheral wall is formed with a rounded upper end forming a valve seat 37 adapted to be engaged by the disk 27 for closing the inlet opening 11. Concentric with and surrounding the valve seat 37 in spaced relation thereto is an inverted frusto-conical wall 38 providing a secondary or emergency valve seat which is adapted to be engaged by the spherical wall portion 25 for positively shutting off the flow of gas through the inlet opening in the event that the fibrous disk 27 is fractured for any reason such as by excess pressure within the casing. The spherical wall portion 25 of the closure element 18 engages against the frusto-conical wall portion 38 annularly in tangent relation therewith whereby the closure element will seat on said secondary or emergency valve seat to close the valve port irrespective of whether or not the closure element engages the seat in exact axial relation.

The lever arm 20 has rocking movement on the cross pin 22 by the pressure differential on opposite sides of a diaphragm 40 which is arranged with its marginal edge portion secured on the annular rim 41 by a removable cover 42. The cover 42 has a threaded vent opening 43 which is adapted to receive a vent pipe (not shown) extending through the roof or to the outside of the building for venting the chamber 44 above the diaphragm to the atmosphere. The diaphragm is provided with an apertured stud 45 which extends downwardly through a centrally apertured cup 46 with the threaded lower end thereof anchored in the upper end of a cylindrical member 47 so as to secure the cup against the upper face of the diaphragm and the cylindrical member in depending relation against the lower face thereof. The opening 48 in the stud 45 provides a passageway through the diaphragm between the lower chamber 50 and the upper chamber 44. The said passageway is normally closed by a ball valve 51 but which is adapted to be opened in case of emergency so as to establish communication between said upper and lower chambers for permitting of the flow of gas in the lower chamber to pass through the upper chamber and be vented to the atmosphere.

The diaphragm 40 is weighted by the cylindrical member 47 to thereby maintain downward pressure on the diaphragm in opposition to upward pressure of the gas within the lower chamber 50. The cylindrical member 47 is guided in its movement by the cylindrical wall portion 52 of the casing within which the lower portion of the cylindrical member has free sliding movement with the lower end thereof normally spaced from the bottom wall 53. The cylindrical member 47 is formed with a vertical bore 54 opening through the opposite ends thereof and communicating with said bore substantially centrally thereof is a vertical slot 55 which opens through one side thereof. The bore 54 is threaded at its upper end in which is secured the stud 45. Arranged in the lower portion of said bore is an expansion device 56 and between said expansion device and the ball valve 51 is an intermediate element 57 having a horizontal bore 58 opening through the opposite side faces thereof in which the ball shaped end 59 of the lever 20 is fitted. The expansion device 56 consists of a coiled expansion spring 60 arranged in tensioned relation in a hollow cylindrical member 61 with the lower end of said spring engaging against the bottom wall thereof and with the upper end of said spring engaging against the lower wall of said intermediate element 57. The expansion spring 60 functions to maintain the intermediate element 57 in tensioned engagement against the ball valve 51 so as to normally close the passageway 48 between the upper and lower chambers 44 and 50. The spring 60 also functions to hold the inner end of the lever 20 in position so as to rock on the cross pin 22 in accordance with the movement of the weight or cylindrical member 47.

The expansion device 56 is normally retained in the bore 54 by a spring detent 62. The detent consists of a spherical element 63 and a coiled expansion spring 64 arranged in a lateral opening 65 in the cylindrical member or weight 47 with the spherical element disposed in protruding relation and tensioned against the recessed face 66 of the cylindrical member 61. A screw plug 67 closes the outer end of the opening 65 and retains the spring against the spherical element 63.

It is to be understood that when the valve closure element 18 is engaged on the valve seat 37 so as to close the valve port 36, the inner end 59 of the lever 20 is held against upward movement. In the event that the valve is closed and the pressure in the lower chamber 50 continues to increase for any reason so as to force the diaphragm 40 upwardly, the cylindrical member or weight 47 will move upwardly therewith. The lever 20 will prevent upward movement of the expansion device 56 whereby the expansion device will be forced out of engagement with the detent 62. The spring 60 will then be released to force the cylindrical member 61 downwardly against the bottom wall 53 of the casing. This will release the pressure of the spring against the ball valve 51 to thereby open the passageway 48 as illustrated in Fig. 6 of the drawings for the discharge of gas from the lower chamber 50 to the atmosphere. The spring 60 will continue to maintain the lever 20 in upward relation to thereby hold the valve 18 closed.

The regulator also includes automatic means for shutting off the flow of gaseous fluid through the valve port 36 in the event of fire in the home or building in which the regulator is installed. The said means consists of a housing 70 secured at its upper end in a threaded opening 71 in the bottom wall 53 of the casing 10 so that the housing depends therefrom in axial vertical alignment with the weight or cylindrical member 47. Arranged within the casing is a plunger 72 having an annular flange 73 at its upper end and an annular recess 74 adjacent its lower end of V shaped formation in vertical section. A coiled expansion spring 75 is arranged about the plunger 72 between the flange 73 and the inwardly directed wall portion 76 of the housing 70. The recessed portion 74 of the plunger is located in the thin walled lower extremity 77 of the housing which is formed to provide a V shaped recess 78 extending annularly about the recess 74 and protruding outwardly beyond the wall portion 76. The annular space defined by the recesses 74 and 78 within the extremity 77 of the housing is filled with a fuse metal 79 or a metal of low melting point which retains the plunger 72 in position in the housing and the spring 75 in tensioned relation. The housing 70 is preferably fashioned of aluminum or other equivalent material while the lower extremity 77 is of reduced thickness in order that the fuse metal 79 will be quickly heated and melted in case of fire. The fuse metal will then give way whereupon the spring 75 will jam the plunger 72 upwardly against the weight or cylindrical member 47 which will force the same upwardly and swing the inner end 59 of the lever 20 upwardly to thereby force the closure member 18 downwardly against its seat 37.

This action of the spring 75 may possibly fracture the fibrous disk 27 so that the same will fail to close the valve port 36. In such event, the closure member 18 will be forced downwardly so that the spherical lower end 25 thereof will be impinged against the conical emergency seat 38 in order to insure complete closure of the valve port 36.

The cup 46 is adapted to receive small particles 81 such as shot and the like to augment the weight of the cylindrical member 47, it being understood that the weight on the diaphragm 40 determines the pressure of the fluid at the outlet 12.

The intermediate element 57 is formed with a circular recess 82 in the upper face thereof for centralizing the ball valve 51 with reference to the seat 83 at the lower end of the passageway 48 and for retaining the same thereon.

It will be understood that with the flow of gaseous fluid through the outlet 12 in accordance with the consumer's requirement, the pressure within the casing below the diaphragm 40 decreases. This causes the weight 47 to descend together with the lever 20 which effects the opening of the valve element 18 in relation to the requirement of the consumer. Since the gaseous fluid at the inlet 11 is at a pressure of 10 to 75 pounds per square inch, a positive pressure of the gaseous fluid will exist in the lower end of the bore 17 and in the slot 21 below the lever 20 and since there is a flow of the gaseous fluid through the outlet opening 12 a negative pressure will exist in the slot 21 above the lever 20. This causes the flow of the gaseous fluid in and out of the lower chamber 50 which regulates the pressure therein. With the lever 20 set to provide an outlet pressure of one-fifth of a pound per square inch, the pressure of the gaseous fluid within the casing below the diaphragm 40 will also be approximately one-fifth of a pound per square inch. By changing the pivotal point 22 of the lever toward the free end thereof, decreases the leverage action and allows for a lower inlet pressure of the fluid and changing the pivotal point toward the valve increases the leverage and allows for a higher inlet pressure. Thus the valve may be set to provide for different inlet pressures.

In the modified form of the invention shown in Figs. 7 and 8 of the drawings, the regulator is constructed for venting the fluid to the atmosphere at a higher pressure than the pressure at which the expansion device is released to move the valve element to closed relation. In this form of the invention the regulator includes a casing 82 having inlet and outlet openings 83 and 84 disposed in axial alignment and adapted to be respectively connected with a high pressure supply line and a low pressure service line. The regulator is provided with a cylindrical member 85 secured in an opening 86 in the casing between the inlet and outlet openings 83 and 84 and formed with a passageway 87 disposed in alignment with said openings. A valve closure element 88 is arranged in said passageway and is pivotally mounted on the end of a lever 89 by a pivot pin 90 for regulating the flow of fluid through the inlet orifice defined by the valve seat 91. A diaphragm 93 subdivides the regulator into upper and lower chambers 94 and 95 with the lower chamber communicating with the passageway 87 by a slot 96 through which the lever 89 projects, this construction and arrangement of the diaphragm and valve element being similar to that described in the previous form of the invention.

In this form of the invention, however, a mercury seal is provided for venting the gaseous fluid from the lower chamber 95 in the event the pressure therein exceeds a predetermined limit. The mercury seal indicated by the reference character 97 is contained in a well 98 open at the top and secured to a member 99 located in the vertical bore 100 of a cylindrical member or weight 101. The well 98 extends upwardly through the diaphragm 93 and projecting downwardly into the well is a vent tube 102 having its lower end disposed in spaced relation from the bottom of the well and with the side walls of the vent tube spaced from the side walls of the well to provide a peripheral space therebetween by which the well may be filled with mercury to the top thereof which will fill the peripheral space and extend upwardly in the vent tube 102 to the top of the well. The vent tube 102 is secured in a yoke 103 having its threaded lower end 104 extending downwardly through a central aperture in the diaphragm and threadedly engaging the cylindrical member or weight 101 to secure the same and the yoke to the diaphragm. A passageway 105 opens through the side of said cylindrical member or weight and communicates at its inner end with the interior of said yoke to permit the pressure of the gaseous vapor within the lower chamber 95 to be exerted on the mercury in the well between the same and the vent tube 102. The cylindrical member or weight 101 is also formed with an opening 106 which communicates with the bore 100 and through which projects the lever arm 89 with the ball shaped inner end thereof disposed in a cylindrical opening 107 in the member 99. The member 99 is maintained in position in the upper end of the bore 100 in the cylindrical member or weight 101 by means of an expansion device 108 similar to the expansion device 56 in the previous form of the invention and which is located in the lower portion of the bore 100. The expansion device 108 is normally maintained in fixed position in said bore by a spring detent 109 similar to the spring detent 65 in the previous form of the invention. The vent tube 102 is slidable in an opening 110 in the top wall of the regulator to permit the same to move with the diaphragm 93. The upper end of the vent tube opens into a passageway 111 which communicates with a vent outlet 112 adapted to be connected with a pipeline leading to the atmosphere outside the building.

In operation, the detent 109 is set to release the expansion device 108 in the event that the gaseous pressure in the lower chamber 95 reaches a pressure of approximately 3/5 of a pound per square inch when the outlet pressure at the outlet 84 is set for 1/5 of a pound per square inch. The detent 109 is released by the upward movement of the diaphragm 93 and weight 101, the expansion device 108 being prevented from upward movement by the lever 89 so that the detent element 109 is moved upwardly beyond the upper end of the expansion device to thereby release the same. Upon release thereof, the casing 114 is forced downwardly against the bottom wall of the regulator and the spring 115 is compressed against the underside of the member 99 to force the lever 89 upwardly and maintain the valve element 88 in closed relation on the valve seat. In the event that there is a leak in the valve seat by which the gaseous pressure within the lower chamber 95 increases to approximately 4/5 of a pound per square inch, the mercury seal 97 will be forced upwardly in the vent tube 102 and expelled through the vent outlet 112 so as to vent the escaping gas to pass from the lower chamber 95 through the vent tube 102 and to the atmosphere outside the building to thereby prevent escape of gas through the inlet 84.

In this type of regulator the upper chamber 95 is in communication with the vent 112 through an opening 117 in the casing to permit of the flow of air into and out of said chamber with the movement of the diaphragm.

In both of the forms of the regulators illustrated and described herein, the downward pressure due to the weight on the diaphragm has direct relation to the pressure of the gas at the outlet. Increasing the weight will increase the pressure at the outlet and decreasing the weight will effect a decrease of pressure at the outlet. As illustrated in Figure 9 of the drawings, the weight 119 on the diaphragm 120, similar to the weight illustrated in the previous form of the invention, may be augmented by a spring 121 interposed between the metallic plate or cup 122 similar to the cup 46 in the form of the invention illustrated in Figs. 1 to 6 of the drawings and a screw plug 123 adjustably secured in the casing 124 of the regulator. Varying the pressure of the spring 121 will vary the pressure of the gas at the outlet of the regulator. This form of regulator may be provided with a mercury seal 125, similar to the mercury seal 97 in the previous form of the invention, which is adapted to be broken to exhaust the gas in the lower chamber through a vent 126 when the pressure in the lower chamber exceeds a predetermined limit.

What is claimed is:

1. In a gas pressure regulator of the type described, a valve element, a lever for moving the valve element toward and away from an inlet orifice, a diaphragm mounted within the regulator and subdividing the interior thereof into upper and lower chambers with the lower chamber in communication with the inlet orifice, a weight secured to said diaphragm to maintain pressure on the diaphragm in opposition to the pressure of the gas within the lower chamber, said lever engaging said weight for movement of the valve element with the movement of the diaphragm by variation in the pressure of the gas in the lower chamber, an expansion device carried by said weight for movement with reference thereto, and a release element normally retaining said expansion device in contracted relation and functioning to release said expansion device upon upward movement of the diaphragm and weight upon increase of the pressure of the gas in the lower chamber beyond a predetermined limit whereby said expansion device is expanded and tensioned against said lever for maintaining the valve element in closed relation.

2. In a gas pressure regulator of the type described, a valve element, a lever for moving the valve element toward and away from an inlet orifice, a diaphragm mounted within the regulator and subdividing the interior thereof into upper and lower chambers with the lower chamber in communication with the inlet orifice, a weight secured to said diaphragm to maintain pressure on the diaphragm in opposition to the pressure of the gas within the lower chamber, said lever operatively engaging said weight for imparting rocking movement thereto by the movement of the weight due to change of the pressure of the gas in the lower chamber acting on said diaphragm, an expansion device including a coil spring mounted in said weight for relative movement, detent means carried by the weight for normally retaining the spring in contracted relation and functioning to release said spring by upward movement of the diaphragm and weight upon increase of the pressure of the gas in the lower chamber beyond a predetermined limit whereby said spring is tensioned against said lever for maintaining the valve element in closed relation.

3. In a gas pressure regulator of the type described, a valve element, a lever for moving the valve element toward and away from an inlet orifice, a diaphragm mounted within the regulator and subdividing the interior thereof into upper and lower chambers with the lower chamber in communication with the inlet orifice, a weight secured to said diaphragm to maintain pressure on the diaphragm in opposition to the pressure of the gas within the lower chamber, an expansion device including a coil spring mounted in a vertically disposed opening in said weight for relative movement of the expansion device with reference to said weight, said lever extending into said weight through a side opening into overlying relation with said expansion device for imparting rocking movement to said lever by the movement of the weight due to change of pressure of the gas in the lower chamber acting on said diaphragm, and detent means carried by the weight for normally retaining the spring and said expansion device in contracted relation and functioning to release said spring by upward movement of the diaphragm and weight upon increase of the pressure of the gas in the lower chamber beyond a predetermined limit whereby the tension of said spring is exerted against the lever for maintaining the valve element in closed relation on the inlet orifice.

4. In a gas pressure regulator of the type described, a valve element, a lever for moving the valve element toward and away from an inlet orifice, a diaphragm mounted within the regulator and subdividing the interior thereof into upper and lower chambers with the lower chamber in communication with the inlet orifice, a weight secured to said diaphragm to maintain pressure on the diaphragm in opposition to the pressure of the gas within the lower chamber, said lever operatively engaging said weight for imparting rocking movement thereto by the movement of the weight due to change of the pressure of the gas in the lower chamber acting on said diaphragm, an expansion device including a coil spring mounted in said weight for relative movement, detent means carried by the weight for normally retaining the spring in contracted relation and functioning to release said spring by upward movement of the diaphragm and weight upon increase of the pressure of the gas in the lower chamber beyond a predetermined limit whereby said spring is tensioned against said lever for maintaining the valve element in closed relation, said regulator having a vent opening therethrough, a tube in communication with said vent, and a seal surrounding the inner end of said tube and subject to the pressure of the gas in the lower chamber and functioning upon increase of pressure of the gas in the lower chamber to a predetermined limit beyond the aforesaid predetermined limit to break said seal and thereby permit of the venting of the gas in the lower chamber through said vent.

VICTOR EY.

References Cited in the file of this patent
UNITED STATES PATENTS

| Number | Name | Date |
|---|---|---|
| 370,152 | McSweeney | Sept. 20, 1887 |
| 1,067,633 | Zander | July 15, 1913 |
| 1,637,085 | Nichols | July 26, 1927 |
| 2,296,428 | Dutch | Sept. 22, 1942 |
| 2,306,746 | Niesmann | Dec. 29, 1942 |